June 7, 1955   L. E. VAN BLARICOM ET AL   2,710,254
PROCESSING CHEMICALS
Filed April 27, 1951   3 Sheets-Sheet 1

FIG. 1

INVENTORS
*Lloyd Eugene Van Blaricom*
*Kenneth Russell Gray*
BY

ATTORNEYS

FIG. 2 — Preparation of sodium lignosulfonate from sulfite waste liquor

June 7, 1955     L. E. VAN BLARICOM ET AL     2,710,254

PROCESSING CHEMICALS

Filed April 27, 1951

PREPARATION OF SODIUM LIGNOSULFONATE FROM WASTE ACID SULFITE PREHYDROLYSIS LIQUOR

FIG. 3

United States Patent Office 2,710,254
Patented June 7, 1955

2,710,254

PROCESSING CHEMICALS

Lloyd Eugene Van Blaricom and Kenneth Russell Gray, Shelton, Wash., assignors to Rayonier Incorporated, Shelton, Wash., a corporation of Delaware Application April 27, 1951, Serial No. 223,182

15 Claims. (Cl. 92—2)

This invention relates to the separation of useful materials from sulfite waste liquor and provides for the preparation of useful products from such liquor by an ion exchange process.

It is an object of the invention to separate a lignosulfonate fraction of sulfite waste liquor from the sugars, and other undesirable constituents such as calcium and heavy metals by a process which is practical and economical. In one of its aspects, the invention aims to carry out the process in such a way that it can be integrated with recovery of heat and inorganic pulping chemicals in a cyclic soda-base sulfite pulping chemical recovery operation.

Another object of the invention is to provide a process for recovery of lignosulfonate from the waste liquor from an acid sulfite prehydrolysis of wood prior to alkaline pulping.

A further object is to provide soluble lignosulfonate salts substantially free from sugars, heavy metals and other undesirable constituents of the waste liquor. Such purified materials are advantageous both for uses based on the colloidal properties of lignosulfonates and for uses as base materials in the preparation of simpler aromatic organic chemicals from lignosulfonates.

The process of the invention provides for discharge of all effluents into inorganic chemical recovery systems for either soda-base acid sulfite pulping or for two-stage pulping employing acid sulfite prehydrolysis. With these cyclic processes, an additional object is to provide through such integration a high degree of economy in the isolation of lignosulfonates and to eliminate any pollution problems connected with the recovery of lignosulfonates.

Broadly the invention provides for the adsorption of lignosulfonates from waste acid sulfite digestion liquor by an anion exchange resin in which substantially the only basic radicals are nitrogen-containing groups consisting essentially of tertiary amino groups, and in which quaternary ammonium groups if present are in minor amounts, without first removing the cations used as a pulping base, followed by regeneration to yield an alkaline lignosulfonate solution free from sugars and other impurities.

In the acid sulfite pulping process, a lignocellulose material is generally cooked in a solution of sulfurous acid, part of the sulfurous acid being combined as bisulfite. The cation combined thus with the bisulfite ion is generally known as the "pulping base" and is used in this sense herein. Pulping base cations normally used include calcium, sodium, ammonium and magnesium.

In one of its embodiments, the invention provides for the steam stripping of sulfite waste liquor to remove free sulfur dioxide, treating this stripped liquor with an anion exchange resin of the type hereinafter more fully described, removing the lignosulfonate adsorbed on the resin by regenerating the resin with an alkaline solution, and removing the excess alkali from this regeneration effluent solution by treating it with a cation exchange resin in hydrogen form. Preferably, the cation exchange resin used is a carboxylic acid type resin. There results a solution of sodium lignosulfonate relatively free from sugars and other contaminating materials.

In a more complete form, the invention provides for integration of the process with cyclic systems for recovering pulping chemicals and heat in soda-base acid sulfite pulping, or in two-stage pulping wherein a soda-base acid sulfite digestion is followed by alkaline pulping. Such integration provides the utmost in economy of operation and eliminates pollution problems. Recovery systems for soda-base sulfite pulping or two-stage pulping with which the process of the invention may be very readily integrated are those described in copending applications by Kenneth Russell Gray, Hartzell Lance Crosby, and John Charles Steinberg, Serial Nos. 415,817 and 415,754, filed March 12, 1954, and United States Letters Patent No. 2,675,297, and United States Letters Patent of Kenneth Russell Gray and Hartzell Lance Crosby Nos. 2,656,249, 2,656,244 and 2,656,245.

Under the most preferable operating conditions the anion exchange resin used in the process will be substantially free from primary and secondary amino groups and will contain as nitrogen-containing groups either substantially only tertiary amino groups or mixtures containing tertiary amino groups predominantly with a small proportion of quaternary ammonium groups.

As used herein, the term "Lignosulfonate" refers to the lignosulfonate anion whether it be present in salts such as the sodium, ammonium, potassium or other salts or whether present as free lignosulfonic acid.

Previous methods for the isolation of lignosulfonate from sulfite waste liquor have involved tedious dialysis procedures or cumbersome precipitation processes requiring extensive settling and filtration operations. There is a need for a simple process for recovering potentially valuable lignosulfonates. Our invention provides such a process in that, with the exception of contacting of the ion exchange resins, it may be carried out as a solution phase process requiring only simple liquid handling equipment and being well adapted to automatic controls.

The general practice in the use of weakly basic anion exchange resins of the amine type (i. e., containing primary and secondary or tertiary amino groups or mixtures of these) has been largely limited to the adsorption of relatively simple anions from solution (e. g., in water conditioning). In all cases, however, in the use of such ion exchange resins of the amine type, it has been considered necessary to remove the metallic cations so that the free acids are actually adsorbed on the resin.

We have made the wholly unexpected discovery that the large lignosulfonate anion may be recovered from sulfite waste liquor by a porous anion exchange resin containing tertiary amino groups without the necessity of first removing the pulping-base cations from the liquor. From an economic standpoint this is a most important discovery since the removal of all pulping-base cations from waste liquor would involve treatment with a strongly acidic cation exchange resin in hydrogen form. This would not only involve expense from the standpoint of acid required for regeneration of such a strongly acidic resin but would involve considerable expense connected with handling a corrosive regenerant (e. g. $H_2SO_4$), a corrosive regeneration effluent and a strongly acidic solution resulting from removal of the pulping-base cations from the sulfite waste liquor (possibly having a pH of about 1 to 2).

In the process of our invention, stripped sulfite waste liquor which is only moderately acid (e. g., pH of about 4) is treated with an anion exchange resin substantially free from primary and secondary amino groups and preferably having as exchange groups solely or predominantly tertiary amino groups, whereby lignosulfonate is adsorbed, the pH of the effluent rising as high as 9 to 11. The ability of relatively weakly basic anion exchange resins to function on the alkaline side is again a wholly unexpected result.

While we do not limit the invention to the mechanism described, we believe that the weakly basic tertiary amino groups in the resin function in this novel manner by reason of the polyfunctionality and high molecular weight of the lignosulfonate which is adsorbed, the polyfunctionality being due to the plurality of sulfonic acid groups present.

In any event as a result of our discovery, it is possible to eliminate any preliminary cation exchange step to replace the pulping-base cations in the sulfite waste liquor with hydrogen ions, resulting in a very simple process. The sugars and other undesirable nonionic organic constituents are not adsorbed in our process and can hence be separated in a single step from the adsorbed lignosulfonate. Calcium is to a large degree eliminated in this treatment and the remainder may be almost entirely removed by a succeeding treatment as described with a carboxylic acid type cation exchange resin.

Under the preferred operating conditions of our invention we find it advantageous to treat the resin with an excess of sulfite waste liquor and to thus adsorb on the resin only a part of the lignosulfonate component. While it is possible to carry out the resin treatment so as to adsorb the entire lignosulfonate component of the waste liquor this requires using a large ratio of resin to liquor. In order to attain the maximum capacity of the resin, it is more practical to use an excess of sulfite waste liquor, since sulfite waste liquor is either of no value, or, if it is used for a heat and chemicals recovery system, the effluent from the anion exchange treatment may be added to this system for recovery of heat and inorganic chemical values.

Use of an excess of sulfite waste liquor to anion exchange resin is also advantageous in that a fractionation of the lignosulfonate itself is effected. The fraction recovered by adsorption on the resin will in general be the fraction most effective for uses based on adsorption properties, e. g., for uses in tanning, dispersing, etc.

The adsorbed lignosulfonate is eluted from the anion exchange resin by the use of an alkaline solution and if the elution is carried out according to the preferred aspect of our invention, the lignosulfonate can be recovered in this step with only a small excess of alkali present. Sodium hydroxide is the preferred eluting agent, though sodium carbonate, potassium hydroxide or carbonate or ammonium hydroxide may be used.

Figure 1:
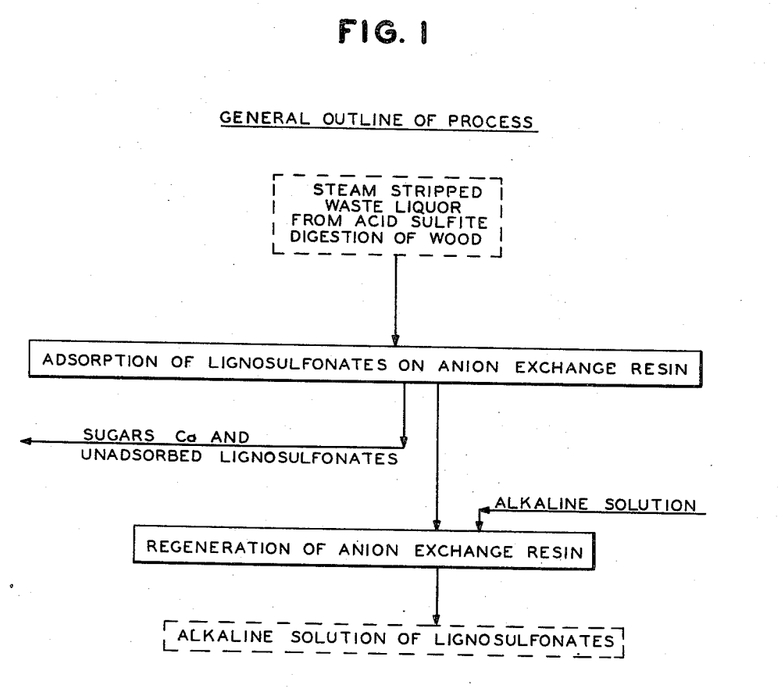
Fig. 1 is a flow sheet illustrating broad aspects of the invention.

The general or broad aspects of the invention will be better understood by reference to the accompanying diagram, Figure 1. Sulfite waste liquor (e. g. from calcium or sodium-base pulping) which has been steam stripped to remove sulfur dioxide is treated with an anion exchange resin free from primary and secondary amino groups and having as exchange centers tertiary amino groups. The effluent or "leakage" from this treatment contains essentially all the sugars originally contained in the liquor, most of the pulping-base cations (e. g. calcium or sodium) of the original liquor, and the unadsorbed lignosulfonates. The anion exchange resin containing adsorbed lignosulfonate is treated with an alkaline regenerant such as sodium hydroxide, thereby removing the adsorbed lignosulfonate and resulting in a solution of lignosulfonates substantially free from nonionic organic components of the waste liquor.

We have also found that the excess alkali can be removed from the solution described above by treating the solution with a cation exchange resin in hydrogen form. While any chemically stable cation exchange resin may be used, we have discovered that if a cation exchange resin of the carboxylic type (rather than the sulfonic type) is used, the excess alkali can be removed, and the resin can be easily regenerated into the hydrogen form with sulfur dioxide solutions.

When sodium hydroxide or sodium carbonate is used as the regenerant for the anion exchange resin, the effluent from the regeneration of the cation exchange resin is a sodium bisulfite solution which may contain some free sulfur dioxide and which can be used for the preparation of soda-base acid sulfite wood digestion liquor. This is advantageous economically as well as from the standpoint of eliminating any disposal problem for the effluent.

It is also an important feature of the discovery that use of a carboxylic acid type resin, rather than a sulfonic acid type resin to remove excess alkali, results in almost complete removal of the residual calcium not removed in the anion exchange step. This selective removal of calcium is accomplished without the necessity of an expensive step to remove all cations other than hydrogen from the solution. (Removal of calcium by removing all cations other than hydrogen, rather than by selective removal, would be very undesirable since it would produce a very acid lignosulfonic acid solution of pH less than 2, which would be corrosive and would tend to quickly pick up heavy metals from pipes and metallic containers.)

Our use of carboxylic acid resins provides a simple method for selectively removing calcium. This is important for such uses as the preparation of tanning agents and dispersing agents for certain uses.

Treatment of the anion exchange resin with the stripped sulfite waste liquor and regenerant solutions may be mechanically accomplished in a number of ways, as, for example, by passing the solutions through a column or bed of the resin. The type of operation wherein the solutions are passed through a fixed bed of resin is hereinafter termed "column operation."

Again the anion exchange resin may be treated with the solution involved in slurry form, generally with stirring. Such slurry treatment may be effected either batchwise or by a continuous addition of the resin to a stream of liquor, later separating the resin from the solution by mechanical means. Such operation involving a slurry, either in batch or continuous treatment, is hereinafter termed "slurry operation."

Generally, in order that the resin will exhibit the highest effective working capacity and in order that regeneration will be most efficient, it will be preferred to treat the anion exchange resin with the solutions in a countercurrent manner. This is especially the case as regards the regeneration step. Such countercurrent operation may be achieved most simply and conveniently by use of a column rather than by use of a multiplicity of slurry stages.

The lignosulfonate product solution from the anion exchange resin may be treated with a cation exchange resin in hydrogen form (to remove alkalinity and selectively remove calcium) in a number of mechanical ways. For example, the solution may be passed through a bed of the resin, or the resin added to the solution either batchwise or in a continuous manner, later separating the resin from the solution by mechanical means. Generally, as with the preceding anion exchange treatment, it will be most convenient to carry out the step as a column operation.

Washing steps following either the anion or cation exchange adsorption or regeneration steps may be carried out in a manner familiar to the art whereby a strong and a weak fraction is recovered, the strong fraction being added to the effluent from the step preceding the wash and the weak fraction being stored for the first wash liquor in the subsequent cycle.

In that the ion exchange process may be carried out in effect as an all solution phase process, it is well adapted to automatic control. The adsorption and regeneration steps and washing operations between these steps may all readily be carried out automatically using conventional control devices such as timing, metering, level control and pH control devices.

The concentration of waste sulfite digestion liquor processed in the invention is not critical. It will, however, frequently be convenient to use sulfite waste liquor of digester strength (e. g. about 8–16% total solids). This liquor being of low viscosity is readily handled with satisfactory flow and a minimum of pressure loss in the columns while still providing sufficient solids content for economical operation.

The temperature of operation is not critical. However, with the anion exchange resin the use of elevated temperatures (e. g. 50–100° C.) particularly in the adsorption of lignosulfonate is advantageous resulting in a higher working capacity for the resin. Also, treatment of sulfite waste liquor at such elevated temperature is particularly advantageous when using digester strength liquor since such liquor is normally recovered at approximately 60–90° C.

The use of elevated temperature is also advantageous in the regeneration of the anion exchange resin in that it increases the efficiency of elution of lignosulfonate by alkaline solutions. The effect is, however, much more pronounced when using as regenerant, sodium carbonate rather than sodium hydroxide. With sodium hydroxide as regenerant, it will generally be most practical to supply no heat other than that which may remain in the system if hot sulfite waste liquor is used as the feed liquor in the lignosulfonate adsorption step.

In the regeneration of the resin, the volume of alkaline solution used and the concentration of alkali in it will depend somewhat on the mechanical conditions used in regeneration—e. g., whether regeneration is carried out as a countercurrent or a slurry operation. The total amount of alkali used in the regeneration, however, should be at least equivalent to the amount of lignosulfonic acid adsorbed on the resin. With caustic soda solution as regenerant, we find it very practical to carry out regeneration in a countercurrent manner and to use an appreciable excess of caustic soda in order to rapidly effect as complete a regeneration as possible and then to take off a fraction of the regenerant effluent which will be practically free from excesses of caustic soda, and to recycle the balance of the regeneration effluent which contains considerable excess caustic soda. Such regeneration effluent containing excess caustic soda is satisfactory for use in making up fresh caustic soda regeneration solution in that the presence of a substantial amount of lignosulfonate does not effect the regeneration materially. The absolute concentration of caustic soda in the regeneration solution used is not critical, and we frequently find it convenient to use concentrations of the order of 2 to 10% sodium hydroxide.

In order to attain the maximum ultimate capacity of the resin in the adsorption and complete regeneration, it would be necessary to use much longer times of contact in both adsorption and regeneration steps than would be necessary when treating solutions of simple inorganic ions. While such times for the ultimate in the adsorption and desorption of lignosulfonate may be of the order of one or more hours, for practical operation it will generally suffice to use lower times. We frequently use contact times in adsorption and regeneration of the order of 5–30 minutes.

The ion exchange process of the invention itself will in its various modifications generally produce a relatively dilute solution of sugar-free lignosulfonate (e. g. most generally containing less than 15% lignosulfonic acid). This solution may be used as such for many purposes. Where, however, the product is to be shipped any distance for further use, it will be advantageous to concentrate it by evaporation. This may be done in a manner similar to those methods normally used for concentrating sulfite waste liquor itself. Thus by multi or single stage evaporation a viscous concentrated solution of sugar-free sodium lignosulfonate (e. g. about 40–60% sodium lignosulfonate) may be produced. Alternatively the product solutions from the ion exchange process may be concentrated to a suitable degree by evaporation and then dried to produce a powdered product by conventional drying means such as spray drying, drum drying, vacuum drying, etc. From the standpoint of improved color, it is advantageous to evaporate down a solution of pH about 5 rather than a neutral or slightly alkaline solution.

Ion exchange resins are in general porous, crosslinked polymeric materials which contain ionizable groups throughout the resin which are capable of exchanging one ion for another. They may thus be considered to be solid gel structures of an ionic nature.

Anion exchange resins are ion exchange resins which will usually contain as the exchange groups primary, secondary or tertiary amino groups or quaternary ammonium groups or mixtures of at least two of these types of nitrogen-containing groups. In general they may be prepared by condensing either aliphatic or aromatic amines (preferably polyamines) to give a porous, crosslinked polymer, as, for example, by use of suitable amounts of formaldehyde or polyhalogen derivatives such as glycerol dichlorhydrin.

Alternatively, amino groups may be introduced into naturally occurring polymeric materials not containing appreciable amounts of such groups by treatment with ammonia in the presence of a catalyst. In such cases where necessary to obtain insolubility, prior, concurrent or subsequent cross-linking will be effected.

From the standpoint of chemical structure, the anion exchange resins which are effective in the process of the invention are cross-linked, nitrogen-containing resins in which substantially all the nitrogen-containing groups are tertiary amino groups and if quaternary ammonium groups be present they are in minor and non-essential amounts. Most effective of all are resins in which essentially the only nitrogen-containing groups are tertiary amino groups.

Anion exchange resins containing appreciable amounts of primary or secondary amino groups are not suitable for use in the invention in that these groups will condense with reducing groups in substances in the sulfite waste liquor with resulting loss of effective capacity.

As regards resins free from primary and secondary amino groups, an anion exchange resin containing all tertiary amino groups is superior to one containing all quaternary ammonium groups since the latter, in view of its very strong basicity, is much less efficient in regeneration by caustic soda.

In addition to the difficulty in regenerating the strongly basic resins containing quaternary ammonium groups, a further disadvantage of these resins, particularly as regards use with calcium-base liquors, is the formation of a precipitate in the effluent from the adsorption stage of the process. This precipitation is probably due in part to the effluent being more basic than is the case when less strongly basic anion exchange resins are used, and results in obstructing flow of solutions when column operation is used. Resins having as nitrogen-containing groups largely tertiary amino groups with the remainder being a small proportion of quaternary ammonium groups may, however, be regenerated relatively efficiently and are economically practical to prepare.

It might be theoretically possible to prepare directly an anion exchange resin containing only tertiary amino groups. In practice, however, it will generally be more feasible to prepare firstly an anion exchange resin in which at least a substantial portion of the nitrogen-containing groups will be primary or secondary amino groups or mixtures of these. Such primary and secondary amino groups may be readily rendered unreactive to reducing groups by alkylating the resin by treatment with alkyl esters of strong acids (e. g., methyl chloride or dimethyl sulfate) in a manner similar to known procedures by which simple amines are alkylated. The resulting resin will be largely free from primary and secondary amino groups and the effective exchange groups will be a mixture of tertiary amino groups and quaternary ammonium groups, the latter generally in smaller amounts.

A commercial anion exchange resin of this type largely free from primary and secondary amino groups (sold under the trade-name of Duolite A–4) has been used in the practice of the invention. As a step in the manufacture, this resin was alkylated to remove primary and secondary amino groups. As a result of the commercial alkylation treatment used, the anion exchange centers in the Duolite A–4 resin used are a mixture of tertiary amino groups and quaternary ammonium groups with the tertiary amino groups probably present in larger amounts.

A still more preferred type of anion exchange resin for use in our invention may be prepared as outlined in our copending application Serial No. 348,802, filed April 14, 1953, by treating an anion exchange resin containing primary or secondary amino groups, or both, with a mixture of formic acid and formaldehyde. By this reaction, primary and secondary amino groups are methylated to form tertiary amino groups with essentially no formation of quaternary ammonium groups. Conveniently the resin in particle form may be treated with an excess of formic acid and formaldehyde, termination of evolution of $CO_2$ serving as an indication of completion of reaction. In carrying out this reaction a resin should be used whose cross-linkages are stable to this treatment, e. g., one in which the cross-linking is not through methylene diamine bridges.

The resin so treated will have essentially no nitrogen-containing groups other than tertiary amino groups. Such a resin is very stable in the presence of reducing groups and being weakly basic may be regenerated more efficiently than resins alkylated in such a manner as to contain in addition to tertiary amino groups an appreciable proportion of quaternary ammonium groups.

A batch of suitable resin with primary and secondary amino groups eliminated in this manner was prepared as follows:

100 g. of Duolite A–2 resin was converted to the free base by treatment with sodium hydroxide and washed thoroughly and then drained. It was then mixed with 222 g. of 90% formic acid and 150 g. of commercial formalin solution, warmed slowly to approximately 90° C. on a steam bath with stirring and heated for a total of 6½ hours. Carbon dioxide was given off during the first part of this heating. The resin was then washed, regenerated to the basic form with sodium hydroxide and again washed.

For an anion exchange resin to be effective in any exchange process in addition to having suitable exchange groups (in our process tertiary amino groups or quaternary ammonium groups) it must be porous to the ions concerned in the adsorption—in our process to lignosulfonate ions. As used in the claims of this application, the term "porous" means porous to the lignosulfonate ion.

For an ion exchange resin with a given type of exchange group, it is possible to have different degrees of porosity, generally according to the degree to which the resin is cross-linked. For any type of ion exchange resin there will generally be an optimum amount of cross-linkage. With very low amounts of cross-linking the resins will be highly porous but the resins will generally be so weak or will swell so highly as to be unsuitable for practical use. With very high degrees of cross-linking the resin particles while having good dimensional stability may have too low porosity to permit adsorption of ions. The optimum will therefore represent a compromise between these two conditions.

It is possible to determine the absolute porosity of ion exchange resins by means of surface area measurements. Such measurements, however, are exceedingly complex and the procedure is not well adapted for use as a routine check of the suitability of the physical properties of the resin for our process. We find it more practical and convenient to select resins with exchange groups known to be effective and to judge whether the resin is porous by determining whether it will adsorb lignosulfonate ions under conditions which are standard, simple and readily reproducible.

The following procedure may conveniently be used to determine in this manner whether a resin is sufficiently porous to be useful in our process:

Approximately 200 ml. of stripped sulfite waste liquor is passed through a column of 17 mm. diameter which contains 100 ml. of wet, regenerated resin at a flow rate of approximately 3.5 ml. per minute. The column is then washed with water until the effluent is colorless and the effluent and washings are combined. The resin is regenerated by passing 100 ml. of 5% NaOH through the column at a flow rate of approximately 2 ml. per minute, followed by a water wash. The regeneration effluent and washings are then combined.

The estimation of the amount of lignosulfonic acid taken up by the resin can most simply be based on the fact that lignosulfonate ion has a very strong and characteristic absorption of light in the ultraviolet wave lengths. By determining on this basis the concentration of lignosulfonic acid in the original solution and that in the combined regeneration effluent and washings, the amount of lignosulfonic acid adsorbed on the resin is given by difference.

A convenient procedure for determining lignosulfonic acid in solution for such resin testing or for determining lignosulfonic acid in solutions at any stage of the process of the invention is given below. This method is applicable to either the original sulfite waste liquor or to intermediate or final solutions of the ion exchange process containing the lignosulfonate ion.

Ultraviolet absorption measurements are made on lignosulfonate containing solutions with a spectrophotometer (conveniently a Beckman spectrophotometer using 1 cm. quartz cells and a hydrogen arc lamp as a light source). The solutions are diluted with distilled water to a known volume such that an optical density reading is obtained which is within the range of the instrument, and the optical density is determined at a wave length of 232.6 millimicrons. The concentration of lignosulfonic acid is then determined by use of the following expression:

$$c = \frac{\text{optical density}}{41.8}$$

where $c$ is the concentration of lignosulfonic acid in grams per liter. The concentration of lignosulfonic acid in the undiluted solution can then be calculated from this value.

The constant 41.8 given in the formula has been determined empirically using a highly purified sample of lignosulfonic acid from sulfite waste liquor from hemlock wood. In order to determine absolute yields of lignosulfonic acid from liquors from different sources, it may be necessary to redetermine this constant for each type of liquor used.

An unexpected feature of our invention is that the anion exchange resin need not be strongly basic, even though actual "salt splitting" of the lignosulfonate salt occurs. In order to demonstrate that a high basicity is not required, relative basicities of the resins may be determined by the following procedure:

Five grams of dry resin are regenerated by soaking in three changes of 5% sodium hydroxide solution, allowing one hour between changes. The resin is then thoroughly rinsed with distilled water until the rinse water is neutral, and covered with 50 ml. of a 1% solution of sodium chloride and stirred for one hour. A sample of the supernatant liquor is then removed and the alkalinity of the solution is determined by titration with a standard acid. The equivalents of sodium hydroxide formed may then be calculated, and this gives a measure of the basicity of the resin.

Table I below shows the relative basicities and the effects in our process of different degrees of alkylation of an anion exchange resin which is porous enough to adsorb lignosulfonate.

TABLE I

*Basicities and effects of different degrees of alkylation on lignosulfonate adsorbing resins*

| Main Anion Exchange Groups in Resin | Resin Basicity Test (Milliequiv.) of NaOH Liberated | Lignosulfonate Adsorption Test | |
|---|---|---|---|
| | | Resin Capacity (gm. LSA Adsorbed/100 ml. wet resin) | Percent of Adsorbed LSA Eluted |
| Substantial Content of Primary and Secondary Amino Groups (Duolite A-2) | 0.073 | 5.5 | 41 |
| Tertiary Amino Groups and Quaternary Ammonium Groups (Duolite A-4) | 0.35 | 5.2 | 84 |
| Tertiary Amino Groups (Duolite A-2 methylated with formic acid and formaldehyde) | 0.06 | 5.8 | 97 |
| Quaternary Ammonium Groups (Resin above alkylated by methyl bromide) | 1.1 | 5.3 | 63 |

As outlined heretofore, an important feature in the preferred operation of our invention is the use of a cation exchange resin containing carboxyl groups to remove excess alkali from the lignosulfonate eluted from the anion exchange resins. The process of the invention is not limited to any particular manner of preparation of the carboxylic acid type ion exchange resins used. Some methods whereby satisfactory weakly carboxylic acid type resins may be prepared follow.

Carboxylic acid type resins may be prepared by polymerizing or co-polymerizing unsaturated organic acids or their anhydrides under conditions whereby cross-linked polymers are formed. Alternatively esters of unsaturated organic acids may be polymerized to form a cross-linked resin and later saponified. Again, noncross-linked alkali-soluble polymers containing carboxyl groups may be subjected to a cross-linking reaction to prepare an insoluble ion exchange resin. Again, carboxylic acid groups may be introduced into natural polymers not already containing these groups. In such cases where necessary to obtain insolubility, prior, concurrent or subsequent cross-linking treatment would be effected. Introduction of carboxylic acid groups would be effected by such means as substitution of carboxy-alkyl groups or by partial oxidation of the original structure.

Ion exchange resins containing both carboxylic acid and phenolic hydroxyl groups may be prepared by polymerizing simple molecules containing both carboxyl and phenolic hydroxyl groups. Alternatively, such resins may be prepared by subjecting polymeric materials containing phenolic hydroxyls as the only exchange group to procedures whereby carboxylic acid groups are introduced in addition to the phenolic hydroxyl groups. Here also, where necessary to obtain insolubility, prior, concurrent, or subsequent cross-linking will be effected.

A specific example of a carboxylic acid resin which may be used in the invention is a maleic anhydride-styrene copolymer which has been cross-linked by the use of divinylbenzene and hydrolyzed to the free acid form. A batch of suitable resin of this type was prepared as follows:

Ninety ml. of styrene, 60 ml. of a divinylbenzene solution containing 20-25% divinylbenzene dissolved in other aromatic hydrocarbons, 100 g. of maleic anhydride, and 50 ml. of acetone were heated on a steam bath for a period of two hours. Temperature in the mixture rose to a maximum of 107° C. and dropped to 90° C. at the end of the two-hour period. The product was then heated in an oven at 135° C. for three hours. It was then washed thoroughly with acetone, soaked for 18 hours in 5% NaOH and then thoroughly washed with water and dried. Yield of product was 121 g.

A commercial resin containing carboxylic acid cation exchange centers (sold under the trade-name of Amberlite IRC-50) has also been used satisfactorily in the practice of the invention.

Figure 2:
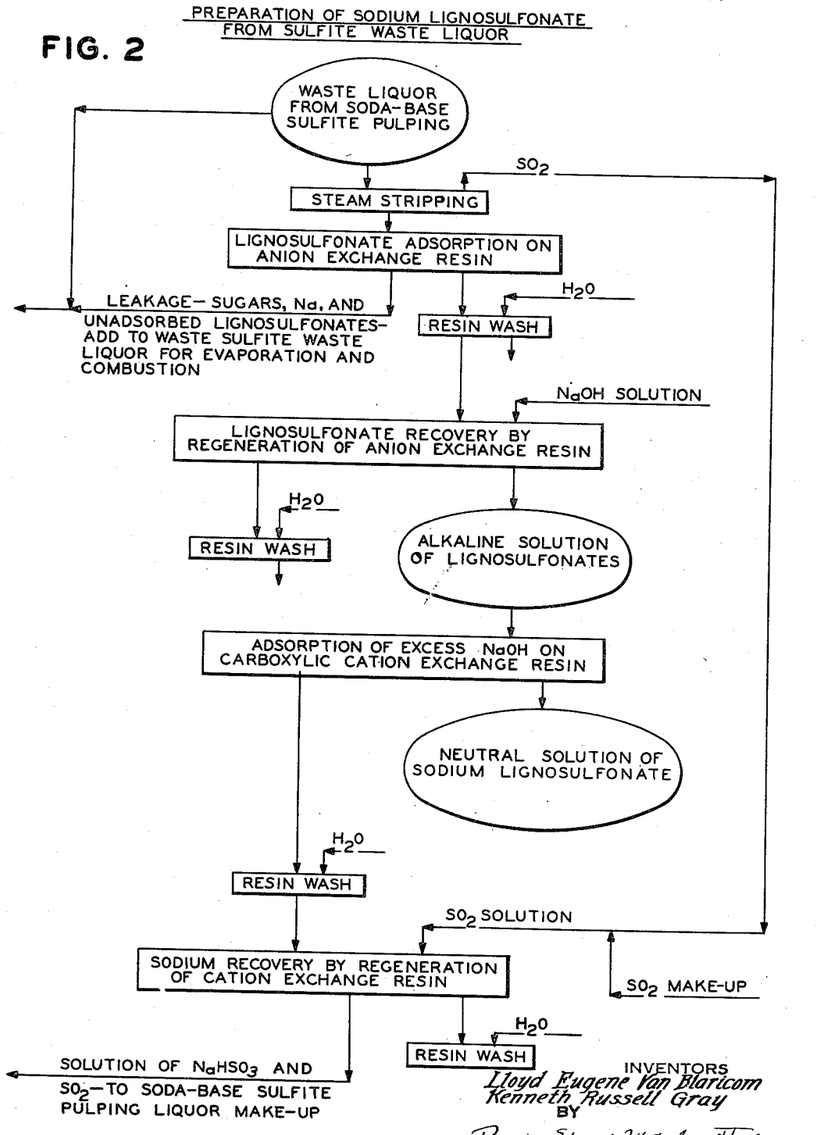
Fig. 2 is a flow sheet illustrating a more complete operation of the invention.

Figure 2 illustrates our invention in a more complete form. Soda-base sulfite waste liquor is steam stripped to remove free $SO_2$. The stripped liquor is then treated with a highly porous anion exchange resin containing essentially tertiary amino groups which adsorbs a portion of the lignosulfonate content of the waste liquor. The effluent from this treatment containing unadsorbed lignosulfonate, sugars, and sodium is added to such other portions of the sulfite waste liquor as is being evaporated and combusted for recovery of inorganic chemicals and/or heat. The anion exchange resin is washed with water, and regenerated with a sodium hydorxide solution which removes the lignosulfonate from the resin and results in an alkaline solution of sodium lignosulfonate. The resin is again washed with water and is then ready for reuse.

In order to remove the small amount of excess sodium hydroxide which is present in the lignosulfonate solution, this solution is then treated with a cation exchange resin of the carboxylic acid type in hydrogen form which results in a neutral or slightly acid (i. e. pH greater than 4) solution of sodium lignosulfonate which can be used as such, evaporated to a concentrated solution, or evaporated to dryness.

The cation exchange resin is washed with water and the adsorbed sodium is removed by treatment of the resin with sulfur dioxide solution. The effluent from this treatment consists of a solution of sodium bisulfite and sulfurous acid which may be used to make up pulping liquor for soda-base acid sulfite digestion of wood.

The cation exchange resin is washed and is then ready for reuse.

The solution resulting from the removal of excess alkali and calcium by the above process (and which is preferably slightly acid) can be evaporated by conventional means to a concentrated solution or to a dry powder. This product is essentially free of sugars and calcium and can be used for tanning agents, dispersing agents, in ore flotation, or as the raw material for the preparation of lower molecular weight pure chemicals such as vanillin or vanillic acid.

For such uses as a drilling mud additive or some other uses, a slight excess of alkali in the product will not be objectionable. In such case, the treatment with the cation exchange resin is not necessary and the product solution from the anion exchange resin may be evaporated directly. When so operating it will be advantageous to carry out the elution of lignosulfonate from caustic soda countercurrently, as heretofore described, and to utilize an initial fraction of the regeneration effluent as product solution. The balance of the regeneration effluent, high in excess caustic soda, would be recycled and used in making up regeneration solution for a succeeding cycle.

Figure 3:
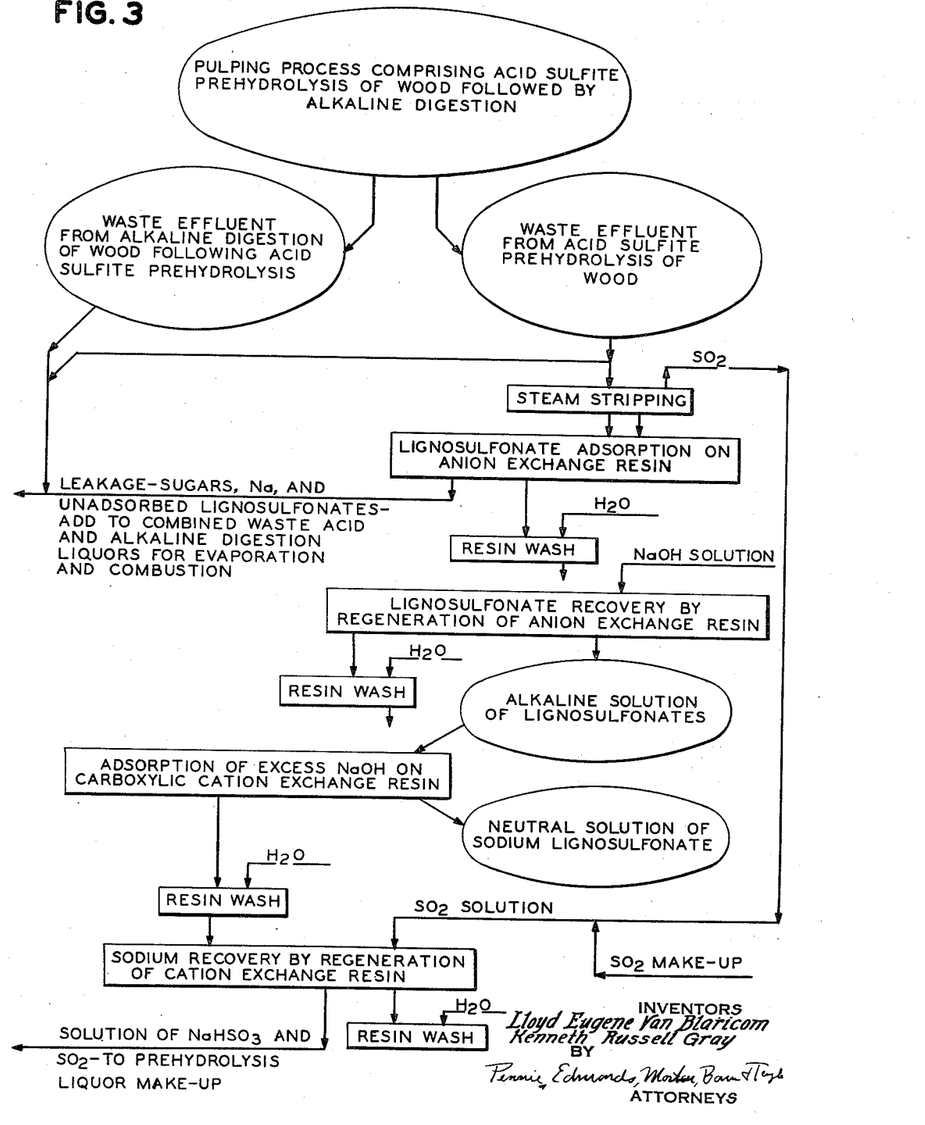
Fig. 3 is a flow sheet illustrating another embodiment of the invention.

The example outlined above and illustrated in Figure 2 is only intended as an illustration of one embodiment of the invention. As an example of use in another pulping operation, the invention may be applied to a pulping sequence wherein lignocellulosic material (e. g. wood) is digested in one stage with a sodium-base acid sulfite solution and in a succeeding stage with an alkaline solution, as illustrated in Figure 3. The feed liquor used is a portion of the waste liquor from the first digestion of the wood with acid sulfite digestion liquor (sodium bisulfite-sulfurous acid), such waste liquor being termed in the diagram "Waste Effluent from Acid Sulfite Prehydrolysis of Wood." The portion of the waste effluent from acid sulfite digestion not used in the ion exchange process is combined with the waste effluent from the alkaline digestion for evaporation and furnacing to recover heat and inorganic chemical values. With the exceptions noted below, the succeeding steps are similar to the corresponding numbered steps of Figure 2. In Figure 3 the waste effluent from the anion exchange treatment is added to the combined waste acid and alkaline digestion liquors being evaporated and combusted for recovery of heat and inorganic pulping chemicals. (In Figure 2 this effluent is added to the waste acid sulfite effluent which is evaporated alone and combusted.) In Figure 3 the NaHSO₃ is used for making up acid sulfite prehydrolysis liquor rather than for making up acid sulfite pulping liquor as in Figure 2.

Sugar-free sodium lignosulfonate recovered from waste acid sulfite prehydrolysis liquor, like the product from regular waste sulfite pulping liquor, may be evaporated by conventional means to a concentrated solution or dry powder. This product, however, as compared to that obtained from waste acid sulfite pulping liquor, is very light in color. This presents advantages for uses where color is important.

As an example of use in another pulping operation, the invention may be applied to a pulping sequence wherein lignocellulosic material (e. g. wood) is digested in one stage with an acid sulfite solution (e. g. sulfurous acid containing calcium bisulfite, ammonium bisulfite or sodium bisulfite) and in a succeeeding stage with an alkaline solution containing sodium sulfite (e. g. NaOH+Na₂SO₃, Na₂CO₃+Na₂SO₃ or a mixture of all three of these chemicals). If only the waste alkaline solution is evaporated and burned for recovery of inorganic chemicals, the ion exchange process may still be readily integrated with this pulping operation. For such integration, the sodium bisulfite produced as a by-product from the regeneration of the carboxylic acid resin column will be used to supply a portion of the make-up sodium sulfite used in the alkaline pulping digestion liquor.

If in such pulping operation the acid sulfite digestion is carried out by means of calcium-base cooking acid, and the portion of the sulfite waste liquor not used in the ion exchange lignosulfonate recovery process is simply discarded, then the unadsorbed effluent from the anion exchange treatment may be similarly discarded. If, however, sodium-base pulping liquor is employed for the acid sulfite digestion and that portion not used in the ion exchange process of the invention is subsequently evaporated and burned for recovery of soda salts, then the unadsorbed effluent from the anion exchange treatment may be combined with the unused portion of the acid sulfite liquor which is being evaporated and burned for recovery of inorganic sodium compounds and heat.

In addition to being sugar-free, a unique characteristic of the lignosulfonate products of the invention is that they represent a lower molecular weight fraction than the entire lignosulfonate content of the waste sulfite pulping or prehydrolysis liquor used as a raw material. This is shown by measurements of the diffusion coefficients of the lignosulfonate products in agar gels, in general the molecular weight being inversely proportional to the cube of the diffusion coefficient. The measurement of diffusion coefficients can conveniently be carried out according to a procedure published by Felicetta, Markham, and McCarthy in the Journal of the American Chemical Society, vol. 71, page 2879, August 1949.

The lower molecular weight and higher diffusivity of the lignosulfonate products of the invention may be of significance in certain uses, particularly in applications making use of the colloidal properties of the products.

In order to demonstrate the differences in molecular weight between the entire lignin content of the feed liquor and the product recovered by ion exchange, the process of the invention was carried out using as starting material, in place of sulfite waste liquor, the entire lignosulfonate content of sulfite waste liquor which had been already isolated without fractionation in a sugar-free condition by a liquid extraction process. Diffusion coefficent measurements were then carried out on the unfractionated starting material, and on the fractions of this material which were adsorbed and unadsorbed on the anion exchange resin in the process of the invention.

The unfractionated sugar-free lignosulfonate used as starting material was prepared from sulfite waste liquor by first removing essentially all cations other than hydrogen by ion exchange, then extracting all lignosulfonate with a butanol solution of di-2-ethylhexylamine, followed by extraction of sodium lignosulfonate from the butanol solution by dilute sodium hydroxide solution.

When this unfractionated, sugar-free sodium lignosulfonate was subjected to the process of the invention, diffusion coefficients were obtained on the original materials and on the fractions obtained as follows:

| | Diffusion Coefficient of Material | Molecular Weight |
|---|---|---|
| Unfractionated sugar-free sodium lignosulfonate used as starting material in process of invention. | 12.6 mm²/day | 11,500 |
| Sodium lignosulfonate fraction adsorbed on anion exchange resin and removed by regeneration according to process of invention. | 15.0 mm²/day | 6,800 |
| Sodium lignosulfonate fraction not adsorbed on anion exchange resin in process of invention. | 8.4 mm²/day | 39,000 |

As a relative measure of molecular weight, molecular weights in the second column were calculated from the diffusion coefficients in the first column by means of the Stokes-Einstein equation which assumes spherical non-interacting, non-hydrated molecules $$M = \frac{K^3}{D} \text{ where } K = \frac{(RT)^3}{162^2 N^2} = 23 \times 10^6$$

under the conditions of our measurements.

In one of the aspects of our invention, the alkaline solution of lignosulfonate resulting from the regeneration of the anion exchange resin may be used directly in the production of mildly alkaline-modified lignosulfonates (referred to hereinafter also as "acid-soluble, alkaline-modified lignosulfonates") or for more drastic alkali treatment to produce by cleavage vanillin or other mononuclear products together with a highly modified and largely desulfonated lignin residue (hereinafter referred to as "alkali-modified, acid-insoluble lignosulfonates"). Use of the alkali-containing lignosulfonate solution from the regeneration of the anion exchange resin directly for either mild alkali treatment or drastic alkali treatment to produce vanillin or related materials, makes possible a two-fold use of the sodium hydroxide used in the ion exchange process, i. e. as a regenerant for the anion exchange resin and to furnish at least part of the alkali requirement for the subsequent alkaline modification or alkaline cleavage treatment.

There are marked advantages for using the sugar-free sodium lignosulfonate of the invention, rather than sulfite waste liquor, in drastic alkaline treatments for the production of vanillin or other cleavage products. In the first place, as elsewhere pointed out, the alkali-containing lignosulfonate solution from the regeneration of the anion exchange resin may be used directly in drastic alkaline cleavage reactions thus supplying part of the alkali required for the alkaline cleavage reaction. Secondly, in that the lignosulfate product of the anion exchange process is substantially free from sugars, by its use rather than use of sulfite waste liquor, there will in general be less consumption of caustic soda—by elimination of side reactions between alkali and sugars. Again, by use of sugar-free lignosulfonate as starting material, the lignosulfonate residue remaining after splitting off vanillin or related cleavage products such as vanillic acid is not contaminated by sugars or their complex degradation products and hence constitutes a much higher grade by-product. Such by-products after removal of any excess caustic soda (conveniently by ion exchange) and after removal of any heavy metal added as a catalyst in the alkali cleavage reaction, constitute very effective dispersing agents for dispersing such materials as carbon black, clays, etc. This type of lignin dispersing agent is very largely desulfonated so that it will largely precipitate upon acidification. This property is very advantageous for such uses as the dispersion of carbon black in latex since, by virtue of the acid insolubility, addition of acid to the latex serves to co-precipitate both rubber and carbon black. Such co-precipitation produces a very uniform dispersion of carbon black in rubber and without the power consumption that would be required to disperse carbon black in solid rubber mechanically or by melting on rolls.

The conditions for the production of mildly alkaline-modified sodium lignosulfonate (i. e. products which are still sufficiently sulfonated to remain soluble on acidification) are very mild as compared to those used in alkaline cleavage reactions for the production of vanillin, vanillic acid, etc. This is particularly the case as regards the proportion of sodium hydroxide to lignin used. Thus to improve the tanning or dispersing properties, sodium lignosulfonate, either as the intermediate product solution from the anion exchange treatment or after subsequent treatment with a cation exchange resin, is heated with aqueous alkali under relatively mild conditions. The conditions to improve the properties by such treatment are not critical. We have used quantities of sodium hydroxide ranging from 0.2 to 3.0 times the quantity of lignosulfonate present and temperatures of from 80° to 150° C. For the particular conditions of caustic soda concentration and temperature used, a reaction time is chosen so that the desulfonation will stop short of the point where there will be appreciable acid insolubility.

Following heating the lignosulfonate solution with alkali as described above, excess alkali is removed with a cation exchange resin of the carboxylic type in the manner described previously. The product may be then evaporated to a concentrated solution or dry powder as desired.

Many attempts have been made in the past to employ sulfite waste liquor products as tanning agents with very little success, even though the calcium in the liquor is replaced with sodium or other suitable cation.

We have found, however, that the sodium lignosulfonate prepared by the process of the invention has improved tanning properties over the sulfite waste liquor from which it is prepared. Whereas calfskin tanned with sulfite waste liquor, treated only to replace calcium by sodium, was very dark in color and hard and brittle (i. e., not "leathered"), calfskin which was tanned with sodium lignosulfonate prepared by the process of the invention was definitely "leathered" and much lighter in color. A still further improvement can be made by alkali modifying the sodium lignosulfonate produced as heretofore described. Calfskin which was tanned with the alkali modified sodium lignosulfonate was tan in color and had a firm but pliable feel.

We have found that the sodium lignosulfonates prepared by the process of the invention (including those modified by alkali treatment) are excellent dispersing agents for solid materials such as clay, pigments, etc. Very small quantities are capable of imparting a tremendous viscosity reduction to dispersions of high solids content which would ordinarily be pastes, but which in the presence of the products of our invention are freely flowing fluids. Products such as these are of importance for use in such dispersions as oil well drilling muds, pottery clay dispersions, printing inks, and similar uses. In view of the substantial absence of sugars and low content of heavy metals and other impurities, the products of the invention will find especially advantageous application in such dispersing uses where presence of the usual impurities of sulfite waste liquor would be objectionable. In view of the low content of sugars the products are especially suitable for use in cement manufacture or use either as aids to grinding the clinker or as additives to improve dispersion or promote air entraining.

In order to clearly illustrate the process of the invention, specific examples are given below. These are not intended to limit the invention to the specific conditions given, but are merely illustrative of the process which may be used in practicing the invention.

EXAMPLE 1

2.5 gallons of steam stripped sulfite waste liquor was added to 5.0 liters of wet, regenerated anion exchange resin (Duolite A–4) and stirred for one hour. The liquor was then drained off, the resin washed, and the wash water drained off. 1.2 gallons of 5% sodium hydroxide was then added, and the mixture stirred for one hour. The solution was then drained off, the resin washed briefly, and the regenerant effluent and washings combined. One gallon of this product was added to 5 liters of a cation exchange resin whose active ion exchange centers were carboxyl groups in hydrogen form and stirred for 12 minutes. It was then drained off and the resin was rinsed briefly, the washings being added to the effluent. The pH of this effluent was 7, and since it was desired to adjust the pH of the solution to 5, a small portion was treated with a cation exchange resin containing sulfonic acid groups in hydrogen form and this treated solution having a pH between 1.5 and 2 was mixed with the main body of the solution. The solution was then evaporated to approximately 40% total solids. Analytical data based on the dry solids were as follows:

| | Per cent |
|---|---|
| Total sulfur | 8.6 |
| Methoxyl | 6.05 |
| Sodium | 9.8 |
| Calcium | 0.05 |
| Silica and trivalent metal oxides | 0.18 |
| Reducing sugars (as dextrose) | 1.06 |

EXAMPLE 2

189 ml. of a steam stripped sulfite waste liquor was passed through a column containing 100 ml. of wet, regenerated anion exchange resin of the tertiary amino type over a period of one hour. The column was then rinsed and regenerated with 115 ml. of 4% sodium hydroxide solution by passing the solution through the resin over a period of one hour. The resin was then washed and the washings added to the regenerant effluent. Analysis by ultraviolet absorption measurements gave the following results:

9.86 g. lignosulfonic acid in original liquor
4.72 g. lignosulfonic acid in exhaustion stage effluent
4.35 g. lignosulfonic acid in regeneration stage effluent

EXAMPLE 3

Using automatic ion exchange equipment, 118 repeated cycles were carried out as follows:

In the first stage, 4.3 liters of wet, anion exchange resin (Duolite A-2), methylated with formic acid and formaldehyde as heretofore described, was placed in a 4-inch inside diameter glass column and 7.5 liters of stripped sulfite waste liquor containing 55 grams of lignosulfonic acid per liter was passed through the column at 20° C. and at a rate of 0.5 liter per minute. During this period, lignosulfonic acid was adsorbed by the resin. Following a brief wash the resin was regenerated at 20° C. and a flow rate of 0.5 liter per minute with 9.0 liters of a solution containing sodium lignosulfonate equivalent to 12 g. of lignosulfonic acid per liter and 45 g. of sodium hydroxide per liter. During this period lignosulfonic acid was desorbed by the regenerant and recovered in the effluent which was divided into four fractions. The first fraction containing chiefly displaced water was discarded, the mixed second and fourth fractions containing considerable alkali and sodium lignosulfonate equivalent to 12 g. of lignosulfonic acid per liter was fortified with alkali and recycled for use in subsequent regenerations, while the third fraction containing 10–15 g. of sodium hydroxide per liter and sodium lignosulfonate equivalent to 40–45 g. of lignosulfonic acid per liter was collected as first stage product.

Under the above operating conditions, the initial capacity of the anion exchange resin was about 3.5 g. of lignosulfonic acid per 100 milliliters of wet regenerated resin. The capacity of the resin decreased to about 2.5 gms. during the first 60 cycles but remained essentially constant at this value from 60–118 cycles. The resin was then treated with cold sulfurous acid solution, washed, and treated with cold sodium hydroxide solution whereupon the initial capacity was restored.

The first stage product, free from sugar but contaminated with a small amount of calcium as well as the excess alkali, was slurried with 8 liters of carboxylic-acid-type cation exchange resin (Amberlite IRC-50) in the hydrogen state for 15 minutes at 20° C. whereupon the excess sodium and most of the residual calcium were adsorbed. The final product then contained sodium lignosulfonate equivalent to 40–45 gms. of lignosulfonic acid per liter, had a pH of 6–7, and was substantially free of calcium. The cation exchange resin required regeneration with a 4–5% solution of sulfur dioxide in water only once every 15 cycles.

EXAMPLE 4

250 gms. of a solution of sodium lignosulfonate containing 39.2% total solids prepared according to the process described in Example 1 was mixed with 500 ml. of water containing 10 gms. of sodium hydroxide and placed in a flask equipped with a reflux condenser. The mixture was then refluxed for two hours, cooled, and a cation exchange resin containing sulfonic acid groups in hydrogen form was added and the mixture stirred. Sufficient resin was added to bring the pH to 2, the solution drained off, and was then boiled down to one-half the original volume to remove any sulfur dioxide produced by the preceding treatment. The solution was then neutralized to pH 5 with sodium hydroxide and evaporated to dryness.

Tannin purity of this material was determined by the standard procedure of the American Leather Chemists Association with the modification that evaporation and drying was carried out for 24 hours at 105° C. Results were as follows, based on dry material and compared with control materials:

|  | Sulfite Waste Liquor | Untreated Sodium Lignosulfonate | Alkali Modified Lignosulfonate |
| --- | --- | --- | --- |
| Soluble Solids, Percent | 97.8 | 100 | 99.6 |
| Tannin, Percent | 41.0 | 47.0 | 50.1 |

Actual calfskin tannage was carried out to compare the leathering qualities of these materials. The procedure was as follows: Small calfskin squares were cut from a calfskin which had been soaked, fleshed, dehaired, and bated by the usual commercial processing methods, and then pickled with salt and sulfuric acid. The squares were depickled by soaking in sodium bicarbonate solution, and the pieces of hide were washed, drained, and weighed. The volume of tanning solution used was equal to 12 times the drained weight of the hide. The solutions were placed in jars and tumbled at 43 R. P. M. in a rotary tumbler for five minutes out of each hour at 23° C. Additions of tanning and pH adjustments were made as follows:

| Day | Tannin Conc., Percent | pH |
| --- | --- | --- |
| 1 | 0.25 | 5.0 |
| 2 | 0.50 | 4.75 |
| 3 | 0.75 | 4.5 |
| 4 | 1.0 | 4.0 |
| 5 | 2.0 | 3.5 |
| 6 and 7 | No addition | |
| 8 | do | 3.25 |
| 9 | do | 3.0 |
| 10 to 14 | do | 3.0 |

All pH adjustments were made by the dropwise addition of dilute sodium hydroxide or sulfuric acid solutions.

At the end of the two-week period, the leather squares were washed in running water for 15 minutes, drained and allowed to stand overnight in the dark. They were then fat liquored in a 5% emulsion in water of neat's-foot oil and sulfonated neat's-foot oil, adding 3% oil based on the drained, wet weight of the leather. The pieces were then dried for several days at room temperature in the dark. Observations of color and feel were made on the dried pieces. Results were as follows:

| Tanning Agent | Color | Feel |
| --- | --- | --- |
| Sulfite Waste Liquor | Dark Brown | Not leathered, horny, brittle. |
| Untreated Sodium Lignosulfonate. | Light Brown | Leathered, but stiff. |
| Alkali Modified Sodium Lignosulfonate. | Tan | Leathered. Firm but pliable. |

EXAMPLE 5

In order to demonstrate the effectiveness of the products of our invention as dispersing agents, as, for example, in oil well drilling muds, the effect of small additions of our products on 7% dispersions of bentonite in water was determined by measurements of viscosity and gel strength, using a Stormer viscometer. The viscosity determined was the viscosity of a freshly stirred dispersion, the zero gel strength was the resistance to shear of a fresly stirred dispersion, and the ten minute gel strength was the resistance to shear of a dispersion which had been allowed to stand without stirring for 10 minutes. Gel strengths so determined give a measure of the thixotropic behavior of the dispersion. The procedures followed in making these measurements were similar to those used by the petroleum industry for the evaluation of oil well drilling muds. Typical results are shown in the table below.

*Viscosity and gel strengths of 7% bentonite dispersion*

| Additive | Viscosity, Centipoises | Zero Gel Strength | 10 min. Gel Strength |
| --- | --- | --- | --- |
| Control | 102.5 | 165 | 177 |
| 0.25% Sodium Lignosulfonate Produced by Ion Exchange | 31.0 | 43.1 | 64 |

We claim:

1. A process for the separation of a lignosulfonate fraction from a lignosulfonate containing waste effluent which comprises subjecting waste liquor from the acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, and treating said resin containing adsorbed lignosulfonate with an alkaline solution to form a lignosulfonate solution substantially free from other organic components of the waste liquor.

2. A process for the separation of a lignosulfonate fraction from a lignosulfonate containing waste effluent which comprises subjecting waste liquor from the acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, and treating said resin containing adsorbed lignosulfonate with sodium hydroxide to form a lignosulfonate solution substantially free from other organic components of the waste liquor.

3. A process for the separation of a lignosulfonate fraction from a lignosulfonate containing waste effluent which comprises subjecting waste liquor from the acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, treating said resin containing adsorbed lignosulfonate with an alkaline solution to form an alkaline lignosulfonate solution substantially free from other organic components of the waste liquor, and treating said alkaline lignosulfonate solution with a cation exchange resin in hydrogen form whereby alkalinity is removed.

4. A process for the separation of a lignosulfonate fraction from a lignosulfonate containing waste effluent which comprises subjecting waste liquor from the acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, treating said resin containing adsorbed lignosulfonate with an alkaline solution to form an alkaline lignosulfonate solution substantially free from other organic components of the waste liquor, treating said alkaline lignosulfonate solution with a cation exchange resin in which the active exchange centers are carboxylic acid groups in hydrogen form whereby alkalinity is removed and calcium contamination selectively adsorbed.

5. A process for the separation of a lignosulfonate fraction from lignosulfonate containing waste effluent which comprises subjecting waste liquor from the acid sulfite digestion of wood to steam stripping to remove sulfur dioxide, treating the stripped liquor containing the cations used as a pulping base with an anion exchange resin in the basic state, said resin being free from primary and secondary amino groups as a result of treatment with formic acid and formaldehyde, said treatment introducing essentially no quaternary ammonium groups, whereby a portion of the lignosulfonate content of the liquor is adsorbed, and treating said resin containing adsorbed lignosulfonate with an alkaline solution to form a lignosulfonate solution substantially free from other organic components of the waste liquor.

6. A process for the separation of a lignosulfonate fraction from a lignosulfonate containing waste effluent which comprises subjecting waste liquor from the acid sulfite digestion of wood to steam stripping to remove sulfur dioxide, treating the stripped liquor containing the cations used as a pulping base with a porous anion exchange resin in the basic state, consisting essentially of tertiary amino groups and in which quaternary ammonium groups if present are in minor amounts, in which substantially the only basic radicals are nitrogen-containing groups, whereby a portion of the lignosulfonate content of the liquor is adsorbed, treating said resin containing adsorbed lignosulfonate with a sodium hydroxide solution to form an alkaline lignosulfonate solution substantially free from other organic components of the waste liquor, treating said alkaline solution of lignosulfonate with a cation exchange resin in which the active exchange centers are carboxylic acid groups in hydrogen form whereby excess sodium hydroxide is removed and calcium contamination selectively adsorbed.

7. A process for the separation of a lignosulfonate fraction from a lignosulfonate containing waste effluent which comprises subjecting waste liquor from the acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, treating said resin containing adsorbed lignosulfonate with sodium hydroxide to form an alkaline lignosulfonate solution substantially free from other organic components of the waste liquor, treating said alkaline lignosulfonate solution with a cation exchange resin in which the active exchange centers are carboxylic acid groups in hydrogen form whereby excess sodium hydroxide is removed and calcium contamination selectively adsorbed, and regenerating said cation exchange resin with sulfurous acid whereby a solution containing sodium bisulfite is formed.

8. A process for the separation of a lignosulfonate fraction from a lignosulfonate containing waste effluent which comprises subjecting waste liquor of approximately digester strength from the acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed; treating said resin containing adsorbed lignosulfonate with sodium hydroxide solution to form an alkaline lignosulfonate solution substantially free from other organic components of the waste liquor, treating said alkaline lignosulfonate solution with a cation exchange resin in which the active exchange centers are carboxylic acid groups in hydrogen form whereby excess sodium hydroxide is removed and calcium contamination selectively adsorbed, and regenerating said cation exchange resin with sulfurous acid whereby a solution containing sodium bisulfite is formed.

9. In the process of preparing wood pulp and recovering chemicals wherein wood is digested with a sodium bisulfite-sulfurous acid solution and in which waste liquor from the wood digestion is evaporated and combusted to yield heat and inorganic chemicals, the improvement which comprises subjecting a portion of the unevaporated waste liquor to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed on the resin, adding the effluent waste liquor from said resin treatment to the other portion of the unevaporated waste liquor for evaporation and combustion to recover heat and inorganic chemicals; treating said resin containing adsorbed lignosulfonate with sodium hydroxide solution to form an alkaline lignosulfonate solution substantially free from other organic components of the waste liquor, treating said alkaline lignosulfonate solution with a cation exchange resin in which the active exchange centers are carboxylic acid groups in hydrogen form whereby excess sodium hydroxide is removed and calcium contamination selectively adsorbed, regenerating said cation exchange resin with sulfurous acid whereby a solution containing sodium bisulfite is formed and utilizing said sodium bisulfite to supply at least a portion of that required in the acid sulfite digestion of the wood.

10. In the process of preparing wood pulp and recovering chemicals wherein wood is digested successively with a sodium bisulfite-sulfurous acid solutions and an alkaline pulping solution and the combined waste acid and alkaline liquors are evaporated and combusted to yield heat and inorganic chemicals, the improvement which comprises subjecting a portion of the unevaporated waste liquor from the acid sulfite digestion to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed on the resin, adding the effluent waste liquor from said resin treatment to the combined waste liquors from the acid and alkaline digestions for evaporation and combustion to recover heat and inorganic chemicals; treating said resin containing adsorbed lignosulfonate with sodium hydroxide solution to form an alkaline lignosulfonate solution substantially free from other organic components of the waste liquor, treating said alkaline lignosulfonate solution with a cation exchange resin in which the active exchange centers are carboxylic acid groups in hydrogen form whereby excess sodium hydroxide is removed and calcium contamination selectively adsorbed, regenerating said cation exchange resin with sulfurous acid whereby a solution containing sodium bisulfite is formed and utilizing said sodium bisulfite to supply at least a portion of that required in the acid sulfite digestion of wood.

11. A process for the separation of a lignosulfonate fraction from a lignosulfonate containing waste effluent which comprises subjecting waste liquor from the acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquor is adsorbed, treating said resin containing adsorbed lignosulfonate with a sodium hydroxide solution to form an alkaline lignosulfonate solution substantially free from other organic components of the waste liquor, heating said alkaline lignosulfonate solution under conditions sufficient to partially desulfonate the lignosulfonate without making it acid insoluble, treating said lignosulfonate solution with a cation exchange resin in which the active exchange centers are carboxylic acid groups in hydrogen form whereby alkalinity is removed and calcium contamination selectively adsorbed.

12. A process for the separation of a lignosulfonate fraction from a lignosulfonate containing waste effluent which comprises subjecting waste liquor from the acid sulfite digestion of wood to steam stripping to remove sulfur dioxide, treating the stripped liquor containing the cations used as a pulping base with a porous anion exchange resin in the basic state, in which substantially the only basic radicals are nitrogen-containing groups consisting essentially of tertiary amino groups and in which quaternary ammonium groups if present are in minor amounts, whereby a portion of the lignosulfonate content of the liquid is adsorbed, treating said resin containing adsorbed lignosulfonate with sodium hydroxide to form a lignosulfonate solution substantially free from other organic components of the waste liquor, adding additional sodium hydroxide to said lignosulfonate solution, heating the resulting alkaline solution for a period of time sufficient to partially desulfonate the lignosulfonate without making it acid insoluble, and treating said solution with a cation exchange resin in which the active exchange centers are carboxylic acid groups in hydrogen form whereby alkalinity is removed and calcium contamination selectively adsorbed.

13. The method of producing lignosulfonate of relatively low molecular weight which comprises removing sulfur dioxide from waste liquor from the acid digestion of wood, contacting the resulting waste liquor with an anion exchange resin having basic radicals preponderantly as tertiary amino groups, using an excess of waste liquor with respect to resin to effect a selective adsorption of lignosulfonate of low molecular weight, and treating the resin having adsorbed lignosulfonate with an alkaline solution to form a solution of low molecular weight lignosulfonate.

14. In the recovery of chemicals from sulfite waste liquor from the acid sulfite digestion of wood stripped of sulfur dioxide and containing the pulping base cations, the steps which comprise adsorbing lignosulfonate from the liquor on an ion exchange resin having as active exchange groups tertiary amino groups in preponderant amount, and displacing the lignosulfonate from the resin with an alkaline solution.

15. In the recovery of chemicals from sulfite waste liquor from the acid sulfite digestion of wood stripped of sulfur dioxide and containing the pulping base cations, the step which comprises adsorbing lignosulfonate from the liquor on an anion exchange resin having as active exchange groups tertiary amino groups in preponderant amount.

References Cited in the file of this patent

UNITED STATES PATENTS

| | | |
|---|---|---|
| 1,904,170 | Richter | Apr. 18, 1933 |
| 1,948,858 | Howard | Feb. 27, 1934 |
| 2,221,282 | Champer | Nov. 12, 1940 |
| 2,320,294 | Palmrose et al. | May 25, 1943 |
| 2,354,553 | Sherk | July 25, 1944 |
| 2,470,500 | Lawrence | May 17, 1949 |
| 2,470,764 | Dunbar | May 24, 1949 |
| 2,481,768 | Mills | Sept. 13, 1949 |
| 2,541,058 | Heritage | Feb. 13, 1951 |
| 2,568,925 | Mills et al. | Sept. 25, 1951 |
| 2,594,302 | Ehrensperger | Apr. 29, 1952 |

FOREIGN PATENTS

| | | |
|---|---|---|
| 859,205 | France | June 3, 1940 |